United States Patent [19]

Factor et al.

[11] Patent Number: 4,900,653
[45] Date of Patent: Feb. 13, 1990

[54] PHOTOGRAPHIC ELEMENTS CONTAINING FILTER DYE PARTICLE DISPERSIONS

[75] Inventors: Ronda E. Factor; Donald R. Diehl, both of Rochester, N.Y.

[73] Assignee: Eastman Kodak Company, Rochester, N.Y.

[21] Appl. No.: 290,602

[22] Filed: Dec. 23, 1988

Related U.S. Application Data

[63] Continuation-in-part of Ser. No. 137,491, Dec. 23, 1987, abandoned.

[51] Int. Cl.$^4$ .................................................. G03C 1/84
[52] U.S. Cl. ................................ 430/522; 430/512; 430/517; 430/591
[58] Field of Search ............... 430/522, 512, 517, 591, 430/592

[56] References Cited

U.S. PATENT DOCUMENTS

| | | |
|---|---|---|
| 2,538,009 | 9/1949 | Keyeo et al. |
| 4,092,168 | 5/1978 | Lemahieu et al. |
| 4,294,916 | 10/1981 | Postle et al. ............ 430/522 |
| 4,294,917 | 10/1981 | Postle et al. ............ 430/522 |
| 4,309,500 | 1/1982 | Shishido. |
| 4,420,555 | 12/1983 | Krueger et al. |

*Primary Examiner*—Jack P. Brammer
*Attorney, Agent, or Firm*—Paul L. Marshall

[57] ABSTRACT

Dyes according to the formula:

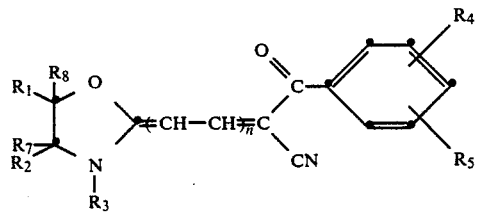

are useful as filter dyes in photographic elements.

In this formula, n is 1 or 2. $R_1$ and $R_2$ are each independently substituted or unsubstituted alkyl or substituted or unsubstituted aryl, or together represent the atoms necessary to complete a substituted or unsubstituted 5- or 6-membered ring. Also, if $R_7$ is substituted or unsubstituted alkyl, $R_1$ is H.

$R_3$ is substituted or unsubstituted alkyl or aryl. $R_4$ and $R_5$ each independently represents H, substituted or unsubstituted alkyl, substituted or unsubstituted aryl, secondary or tertiary amino, $CO_2H$, or $NHSO_2R_6$, with the proviso that at least one of $R_4$, $R_5$, or a substituent on an aryl ring in $R_3$, on an aryl ring in $R_4$ or $R_5$, on an aryl ring in $R_1$ or $R_2$, or on an aryl ring formed by $R_1$ and $R_2$ is $CO_2H$ or $NHSO_2R_6$. $R_6$ is substituted or unsubstituted alkyl or substituted or unsubstituted aryl. $R_7$ is substituted or unsubstituted alkyl, or together with $R_8$ forms a double bond. $R_8$ is H or together with $R_7$ forms a double bond.

6 Claims, No Drawings

PHOTOGRAPHIC ELEMENTS CONTAINING FILTER DYE PARTICLE DISPERSIONS

This is a continuation-in-part of application Ser. No. 137,491, filed Dec. 23, 1987, now abandoned.

FIELD OF THE INVENTION

This invention relates to dyes, particularly dyes useful as filter dyes, especially in photographic elements.

BACKGROUND OF THE INVENTION

Photographic materials often contain filter dyes to absorb light from different regions of the spectrum, such as red, blue, green, ultraviolet, and infrared, to name a few. These filter dyes are often required to perform the function of absorbing light during exposure of the material so as to prevent or at least inhibit light of a region of the spectrum from reaching at least one of the radiation-sensitive layers of the element.

After processing of the element, however, the continued presence of the filter dye will adversely affect the image quality of the photographic material. It is therefore desirable to use filter dyes that will be solubilized and removed or at least decolorized during photographic processing. Dyes that are easily solubilized, however, tend to wander throughout the photographic material during coating, adversely affecting the final image quality.

To prevent dye wandering, the dyes are often coated with a mordant to bind the dye in the layer in which it is coated. Dye mordants, while often useful, tend to either bind the dye too strongly, inhibiting solubilization of the dye during photographic processing, or too weakly, thus not preventing dye wandering.

It would therefore be highly desirable to provide a filter dye for use in photographic elements that does not wander during coating, is fully solubilized during processing, and does not require a mordant.

SUMMARY OF THE INVENTION

According to the invention, there is provided a dye of the formula:

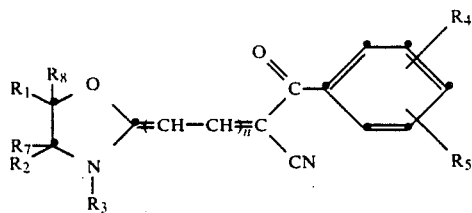

In this formula, n is 1 or 2. $R_1$ and $R_2$ are each independently substituted or unsubstituted alkyl or substituted or unsubstituted aryl, or together represent the atoms necessary to complete a substituted or unsubstituted 5- or 6-membered ring. Also, if $R_7$ is substituted or unsubstituted alkyl, $R_1$ is H.

$R_3$ is substituted or unsubstituted alkyl or aryl. $R_4$ and $R_5$ each independently represents H, substituted or unsubstituted alkyl, substituted or unsubstituted aryl, secondary or tertiary amino, $CO_2H$, or $NHSO_2R_6$, with the proviso that at least one of $R_4$, $R_5$, or a substituent on an aryl ring in $R_3$, on an aryl ring in $R_4$ or $R_5$, on an aryl ring in $R_1$ or $R_2$, or on an aryl ring formed by $R_1$ and $R_2$ is $CO_2H$ or $NHSO_2R_6$. $R_6$ is substituted or unsubstituted alkyl or substituted or unsubstituted aryl. $R_7$ is substituted or unsubstituted alkyl, or together with $R_8$ forms a double bond. $R_8$ is H or together with $R_7$ forms a double bond.

The dyes of the invention are useful as general purpose filter dyes, alone or in combination with other filter dyes in photographic elements. They are insoluble at coating pH's of 6 or less (generally 4 to 6) and soluble at processing pH's of 8 or more (generally 8 to 12), so that they do not interact with other components of the photographic element, yet still are fully solubilized during photographic processing.

DESCRIPTION OF THE PREFERRED EMBODIMENTS

According to formula (I), $R_1$, $R_2$, $R_3$, $R_4$, $R_5$, and $R_6$ may each be substituted or unsubstituted alkyl or substituted or unsubstituted aryl, preferably substituted or unsubstituted alkyl of 1 to 6 carbon atoms or substituted or unsubstituted aryl of 6 to 12 carbon atoms. $R_7$ may be substituted or unsubstituted alkyl of from 1 to 6 carbon atoms. The alkyl or aryl groups may be substituted with any of a number of substituents as is known in the art other than those, such as sulfo substituents, that would tend to increase the solubility of the dye so much as to cause it to become soluble at coating pH's. Examples of useful substituents include halogen, alkoxy, ester groups, amido, acyl, and alkylamino. Examples of alkyl groups include methyl, ethyl, n-propyl, isopropyl, n-butyl, isobutyl, n-pentyl, n-hexyl, or isohexyl. Examples of aryl groups include phenyl, naphthyl, anthracenyl, pyridyl, and styryl.

$R_1$ and $R_2$ may also together represent the atoms necessary to complete a substituted or unsubstituted 5- or 6-membered ring, such as phenyl, naphthyl, pyridyl, cyclohexyl, dihydronaphthyl, or acenaphthyl. This ring may be substituted with substituents, other than those, such as sulfo substituents, that would tend to increase the solubility of the dye so much as to cause it to become soluble at coating pH's. Examples of useful substituents include halogen, alkyl, alkoxy, ester, amido, acyl, and alkylamino.

Examples of dyes according to formula (I) include the following:

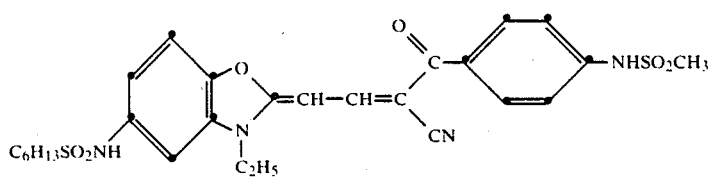

1

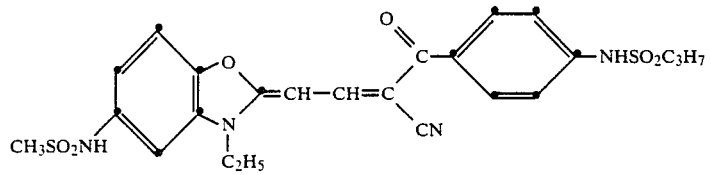 2
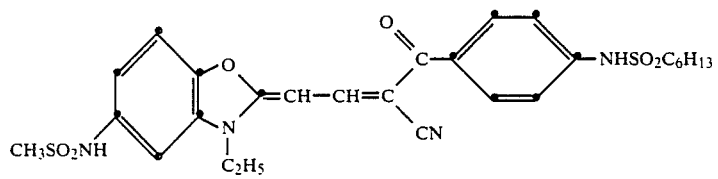 3
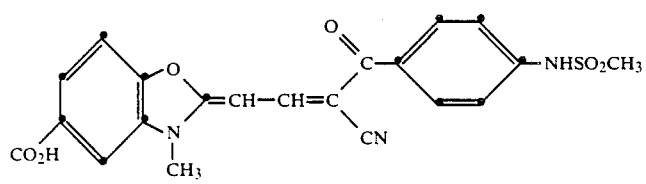 4
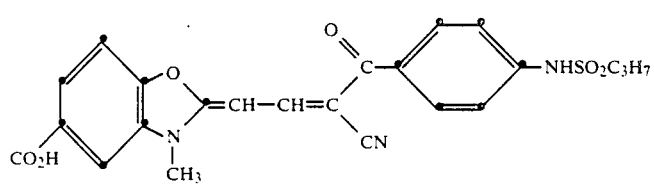 5
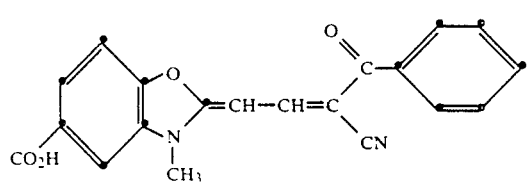 7
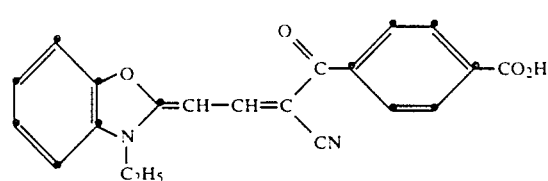 8
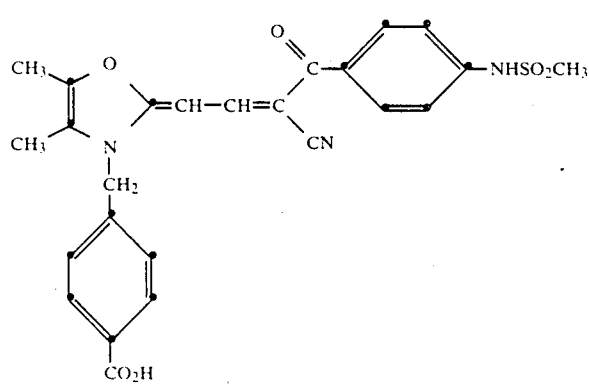 9

-continued
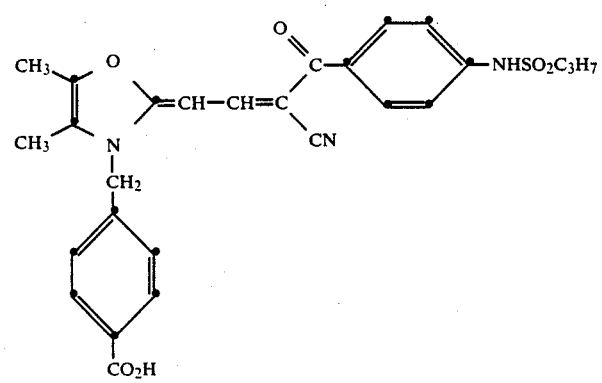
10
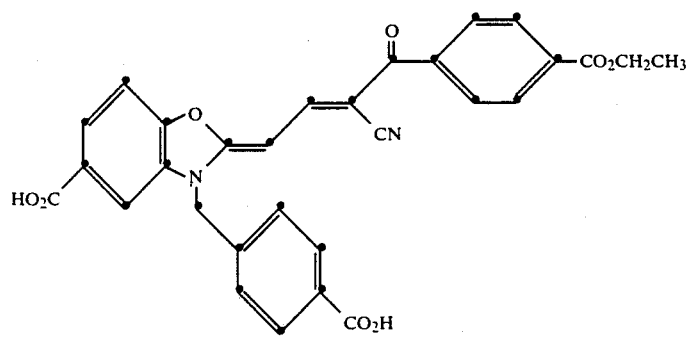
11
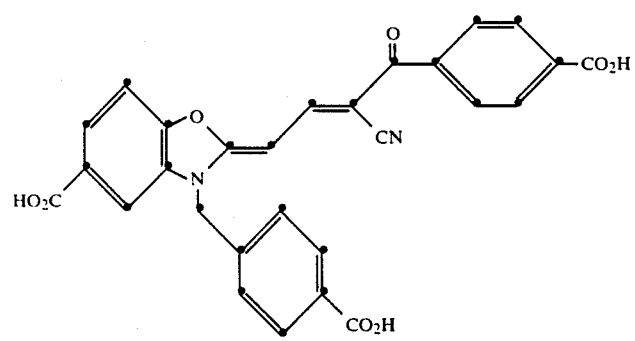
12
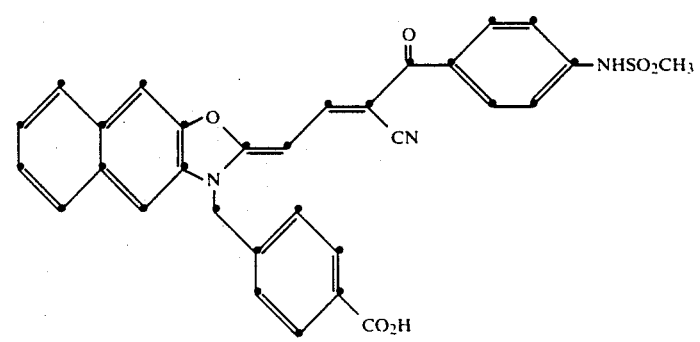
13

-continued
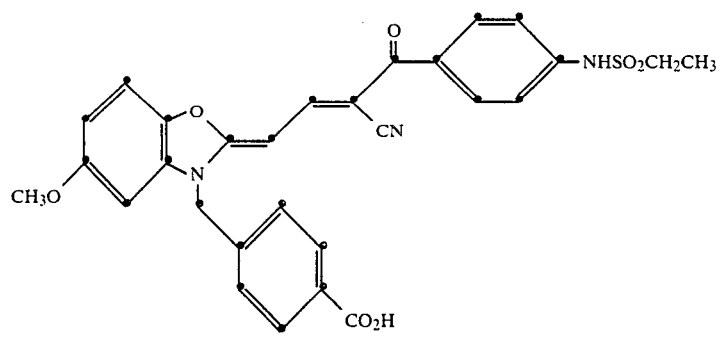
14
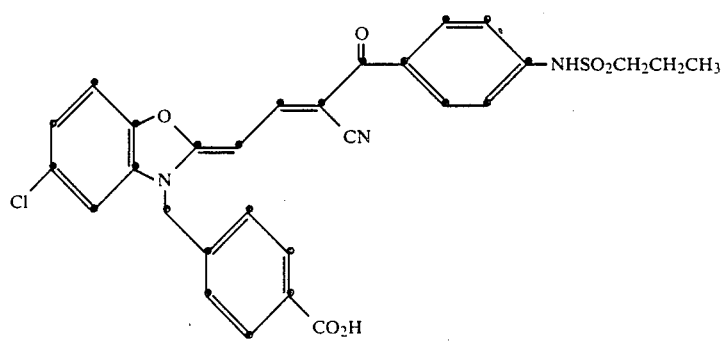
15
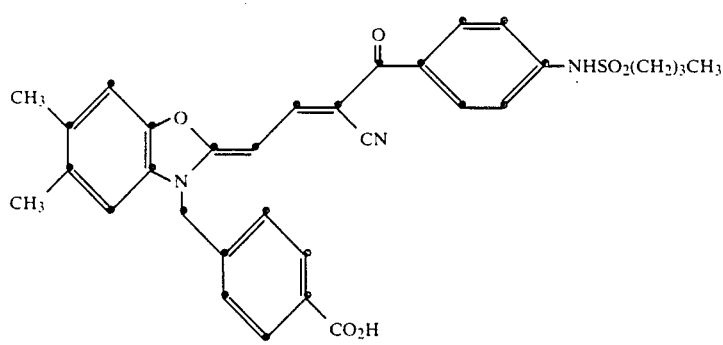
16
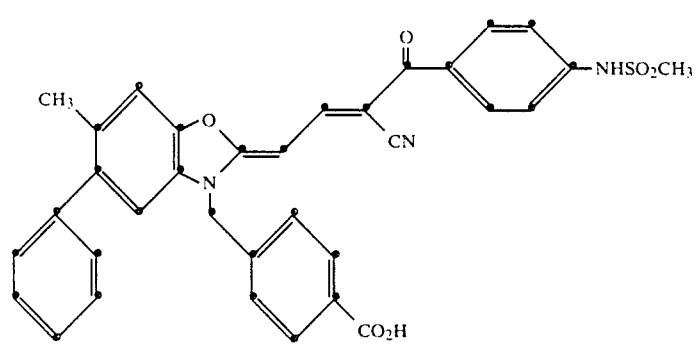
17
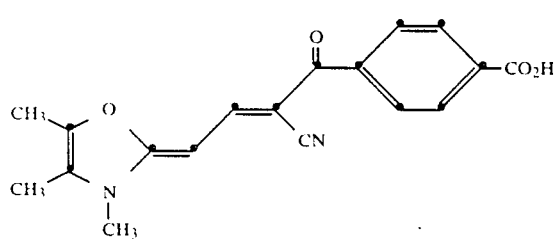
18

-continued
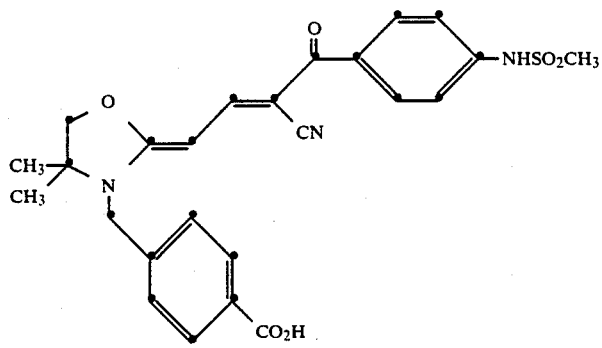
19
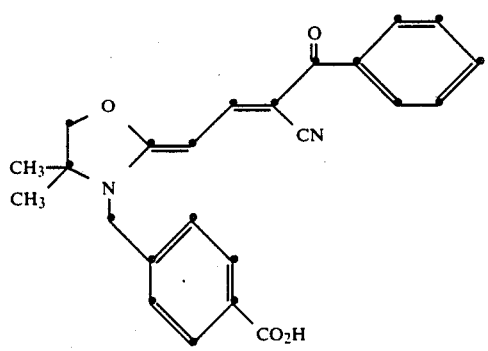
20
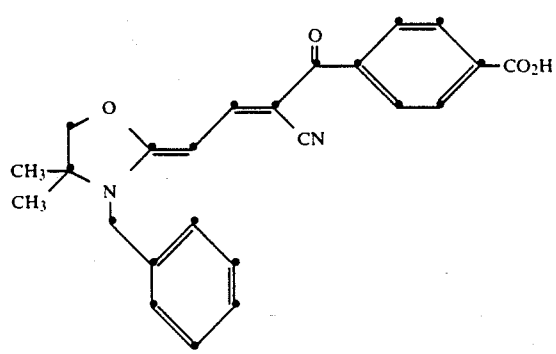
21
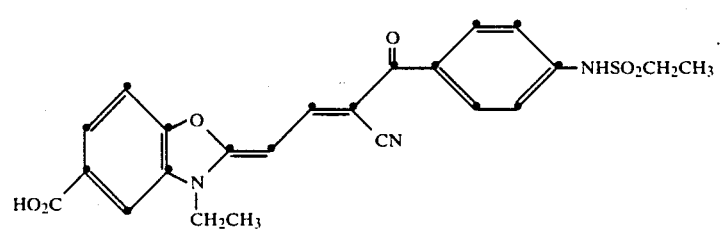
22
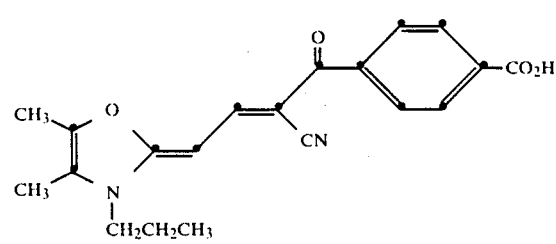
23

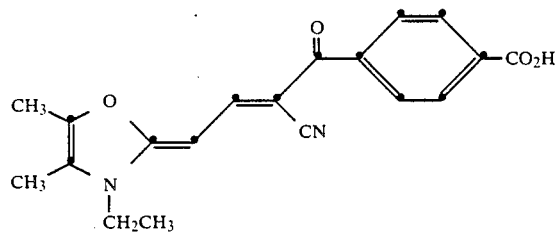
24
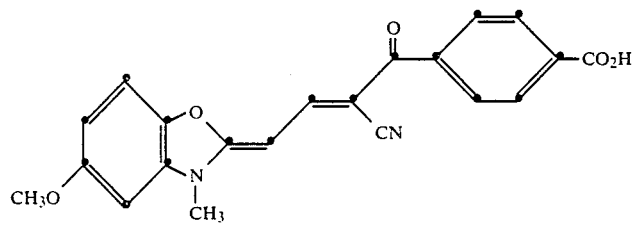
25
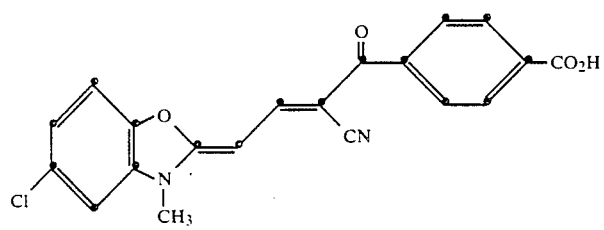
26
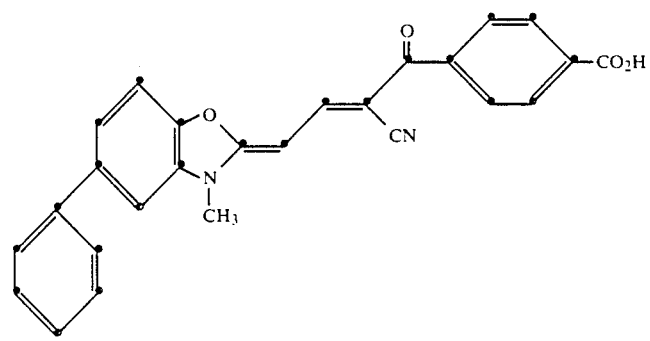
27
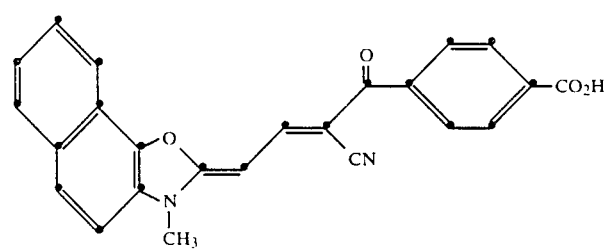
28
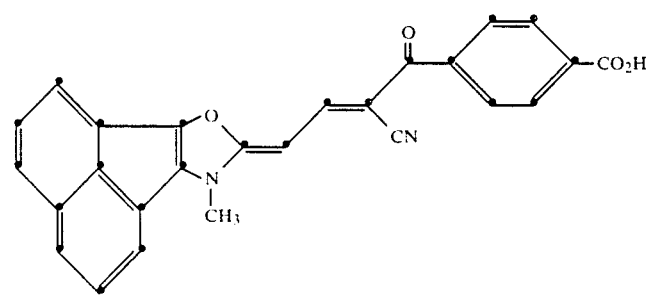
29

-continued
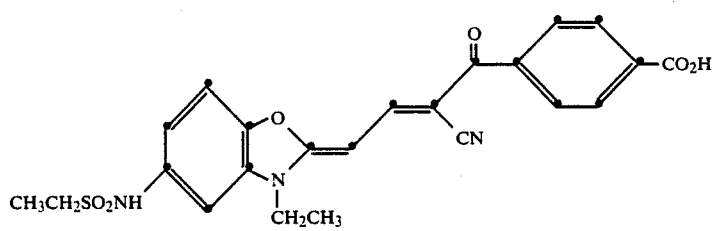
30
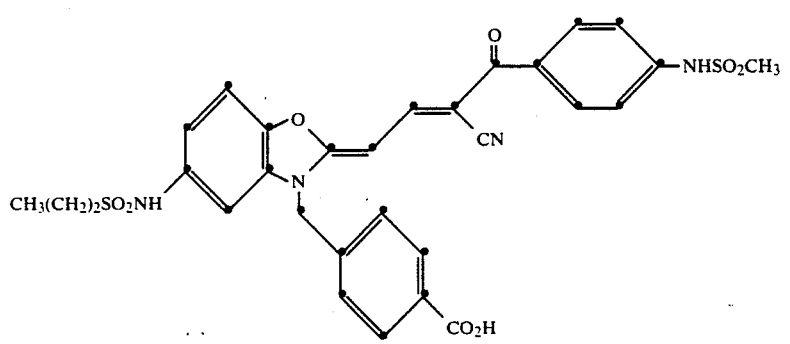
31
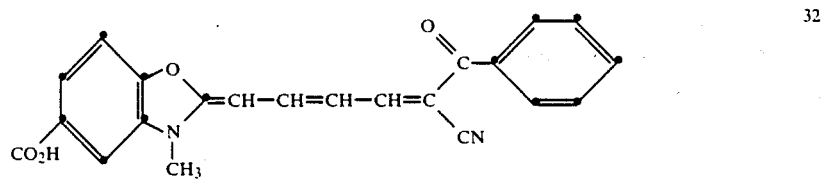
32
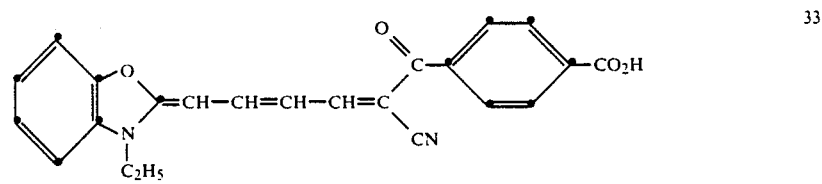
33
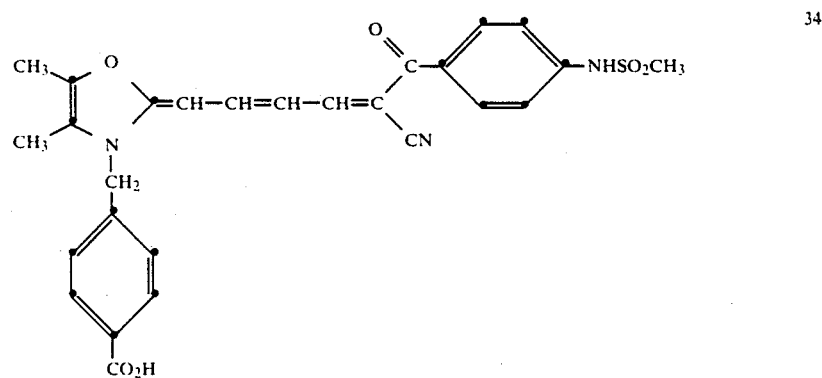
34

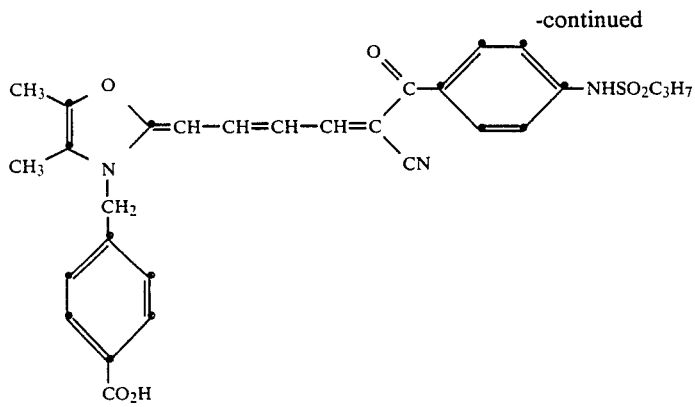

35

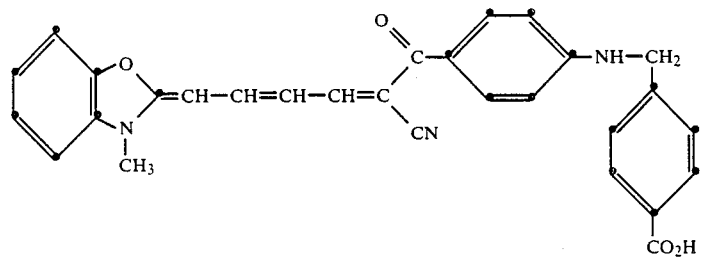

36

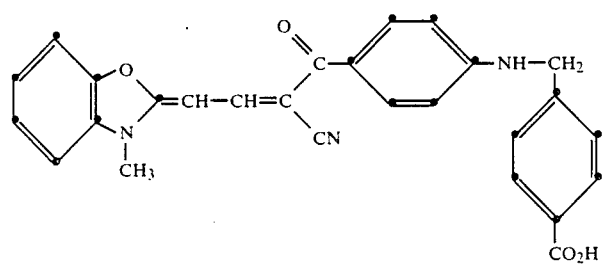

37

The dyes of formula (I) can be prepared by synthetic techniques well-known in the art, as illustrated by the synthetic examples below. Such techniques are further illustrated, for example, in "The Cyanine Dyes and Related Compounds", Frances Hamer, Interscience Publishers, 1964.

The dyes of formula (I) are preferably utilized in the form of a solid particle dispersion (i.e., the dye is in the form of solid particles of microscopic size) for incorporation into a layer such as a hydrophilic colloid layer of a photographic element, although some of the dyes can also be incorporated in other ways, such as in the solvent phase of an "oil in water type" dispersion or in loaded polymer latex particles as described in Research Disclosure, Item 19551, July, 1980.

The dyes may be located in any layer of the element where it is desirable to absorb light, but it is particularly advantageous to locate them in a layer where they will be solubilized and washed out during processing. Useful amounts of dye range from 1 to 1000 mg/m$^2$. The dye should be present in an amount sufficient to yield an optical density at the transmission D-max in the visible region before processing of at least 0.10 density units and preferably at least 0.50 density units. This optical density will generally be less than 5.0 density units for most photographic applications.

The solid particle dispersion can be formed by precipitating the dye in the form of a dispersion and/or by well-known milling techniques, e.g., ball-milling, sand-milling, or colloid-milling (preferably ball-milling or sand-milling) the dye in the presence of a dispersing agent. The dye particles in the dispersion should have a mean diameter of less than 10 $\mu$m and preferably less than 1 $\mu$m. The dye particles can be conveniently prepared in sizes ranging down to about 0.01 $\mu$m.

The support of the element of the invention can be any of a number of well-known supports for photographic elements. These include polymeric films such as cellulose esters (e.g., cellulose triacetate and diacetate) and polyesters of dibasic aromatic carboxylic acids with divalent alcohols (e.g., poly(ethylene terephthalate)), paper, and polymer-coated paper. Such supports are described in further detail in Rsearch Disclosure, December, 1978, Item 17643 [hereinafter referred to as Research Disclosure], Section XVII.

The radiation-sensitive layer of the element of the invention can contain any of the known radiation-sensitive materials, such as silver halide, diazo image-forming systems, light-sensitive tellurium-containing compounds, light-sensitive cobalt-containing compounds, and others described in, for example, J. Kosar, Light-Sensitive Systems: Chemistry and Application of Non-silver Halide Photographic Processes, J. Wiley & Sons, N.Y. (1965). Radiation-sensitive materials exhibiting sensitivity to blue light and especially those sensitive to blue light and at least some other wavelength of radiation are preferred, as the dyes according to the invention can be advantageously used to absorb some or all of the blue light.

Silver halide is especially preferred as a radiation-sensitive material. Silver halide emulsions can contain, for example, silver bromide, silver chloride, silver iodide, silver chlorobromide, silver chloroiodide, silver bromoiodide, or mixtures thereof. The emulsions can include coarse, medium, or fine silver halide grains bounded by 100, 111, or 110 crystal planes. Silver halide emulsions and their preparation are further described in *Research Disclosure*, Section I. Also useful are tabular grain silver halide emulsions, as described in *Research Disclosure*, January, 1983, Item 22534 and U.S. Pat. No. 4,425,426.

The radiation-sensitive materials described above can be sensitized to a particular wavelength range of radiation, such as the red, blue, or green portions of the visible spectrum, or to other wavelength ranges, such as ultraviolet, infrared, X-ray, and the like. Sensitization of silver halide can be accomplished with chemical sensitizers such as gold compounds, iridium compounds, or other group VIII metal compounds, or with spectral sensitizing dyes such as cyanine dyes, merocyanine dyes, styryls, or other known spectral sensitizers. Additional information on sensitization of silver halide is described in *Research Disclosure*, Sections I-IV.

The dyes of formula (I) where n is 1 tend to absorb light in the blue portion of the spectrum, and are thus useful in many applications requiring the use of a blue-absorbing filter dyes. For example, they can be used as interlayer dyes, trimmer dyes, or antihalation dyes. They can be used to prevent crossover in X-ray materials, to prevent unwanted blue light from reaching the green-sensitive emulsion layer of a multicolor photographic element, and other uses as indicated by the absorbance spectrum of the particular dye. The dyes can be used in a separate filter layer or as an intergrain absorber.

Multicolor photographic elements according to the invention generally comprise a blue-sensitive silver halide layer having a yellow color-forming coupler associated therewith, a green-sensitive layer having a magenta color-forming coupler associated therewith, and a red-sensitive silver halide layer having a cyan color-forming coupler associated therewith. Color photographic elements and color-forming couplers are well-known in the art and are further described in *Research Disclosure*, Section VII.

The element of the invention can also include any of a number of other well-known additives and layers, as described in *Research Disclosure*. These include, for example optical brighteners, antifoggants, image stabilizers, light-absorbing materials such as filter layers or intergrain absorbers, light-scattering materials, gelatin hardeners, coating aids and various surfactants, overcoat layers, interlayers and barrier layers, antistatic layers, plasticizers and lubricants, matting agents, development inhibitor-releasing couplers, bleach accelerator-releasing couplers, and other additives and layers known in the art.

The dye of formula (I) can be located in any layer of a photographic element where it is desired to absorb light. In a preferred embodiment, the dye is preferably located in a layer where it will be subjected to high pH (i.e., 8 to 12) and/or sulfite during photographic processing, so as to allow the dye to be solubilized and removed or decolorized.

The photographic elements of the invention, when exposed, can be processed to yield an image. During processing, the dye of formula (I) will generally be decolorized and/or removed. Following processing, the dye of the invention should contribute less than 0.10 density unit, and preferably less than 0.02 density unit to the transmission D-max in the visible region in the minimum density areas of the exposed and processed element.

Processing can be by any type of known photographic processing, as described in *Research Disclosure*, Sections XIX–XXIV, although it preferably includes a high pH (i.e., 8 or above) step utilizing an aqueous sulfite solution in order to maximize decolorization and removal of the dye. A negative image can be developed by color development with a chromogenic developing agent followed by bleaching and fixing. A positive image can be developed by first developing with a non-chromogenic developer, then uniformly fogging the element, and then developing with a chromogenic developer. If the material does not contain a color-forming coupler compound, dye images can be produced by incorporating a coupler in the developer solutions.

Bleaching and fixing can be performed with any of the materials known to be used for that purpose. Bleach baths generally comprise an aqueous solution of an oxidizing agent such as water soluble salts and complexes of iron (III) (e.g., potassium ferricyanide, ferric chloride, ammonium of potassium salts of ferric ethylenediaminetetraacetic acid), water-soluble persulfates (e.g., potassium, sodium, or ammonium persulfate), water-soluble dichromates (e.g., potassium, sodium, and lithium dichromate), and the like. Fixing baths generally comprise an aqueous solution of compounds that form soluble salts with silver ions, such as sodium thiosulfate, ammonium thiosulfate, potassium thiocyanate, sodium thiocyanate, thiourea, and the like.

The invention is further illustrated by the following Examples:

EXAMPLE 1

Dye 1

Step 1—Preparation of Intermediate A

To a solution of 29.6 g of 5-amino-2-methylbenzoxazole in 100 ml pyridine cooled to 0° C. was added 41.3 g hexanesulfonyl chloride. After 1 hour stirring at 0° C., a reddish precipitate formed. The reaction mixture was stirred at room temperature for 2 days and then poured into 1.4 l of water and stirred for 2 hours. A heavy oil deposited and the supernatant was decanted. The oil was dissolved in 1.0 l dichloromethane, which was extracted with 4×200 ml of 1N hydrochloric acid, then dried over magnesium sulfate. The solvent was removed, leaving a reddish brown liquid of 5-hexylsulfonamido-2-methylbenzoxazole (Intermediate A).

Step 2—Preparation of Intermediate B

A mixture of 60 g of intermediate A and 44 g ethyl p-toluenesulfonate was heated in a round bottom flask at 150° C. for 5 minutes. Upon cooling to room temperature, the crude brown mass was almost solidified. The product was dissolved in 25 ml methanol and poured into 300 ml diethyl ether with rapid stirring for 1 hour. The solid precipitate was chilled at 2° C. overnight, and then filtered. The tan powder was thoroughly washed with ether and recrystallized from 200 ml hot isopropyl alcohol to yield 23.4 g of 3-ethyl-5-hexylsulfonamido-2-methylbenzoxazolium p-toluenesulfonate (Intermediate B).

Step 3—Preparation of Intermediate C

A combination of 10 g Intermediate B and 8 g N,N-diphenylformamidine was thoroughly mixed and heated with stirring at 150°-160° C. for 25 minutes. The flask was then fitted with a condenser and 50 ml hot acetone was cautiously added. An orange precipitate formed. The flask was removed from the heat, cooled, and chilled in ice. After 1 hour, the reddish precipitate was filtered off and discarded. The filtrate was poured into 300 ml diethyl ether and stirred for 2 hours. The resulting yellow-orange powder was filtered, washed with ether, and dried to yield 10.6 g of 2-(2-anilinovinyl)-3-ethyl-5-hexyl-sulfonamidobenzoxazolium p-toluenesulfonate (Intermediate C).

Step 4—Preparation of Dye 1

A mixture of 2.7 g of Intermediate C, 15 ml ethanol, 0.54 g acetic anhydride, and 0.7 ml triethylamine was heated at reflux for 1 minute. Then 1.2 g 4-methylsulfonamidobenzoylacetonitrile (prepared according the procedure disclosed in Kreuger et al U.S. Pat. No. 4,420,555) and 0.8 ml triethylamine were added and the mixture was heated at reflux for 2 minutes. The mixture was then chilled in ice for 30 minutes. The yellow-orange precipitate that had formed was filtered, washed with isopropyl alcohol and diethyl ether, then air dried to yield 1.17 g of crude dye. The reaction was repeated twice more to obtain a total of 3.0 g of crude dye, which was dissolved in 250 ml hot acetone, which was stirred with 10 g Amberlyst-15 ® ion exchange resin for 3 hours, heated for 15 minutes to reflux, then filtered while hot. The filtrate was chilled to 2° C. overnight and the resulting yellow precipitate was air dried to yield 2.3 g of Dye 1. The dye had a melting point of 297°-298° C., $\lambda$-max=442 nm (methanol), $\epsilon = 7.32 \times 10^4$.

EXAMPLE 2

Dye 4

Step 1—Preparation of Intermediate D

To a slurry of 4-methylsulfonamidobenzoylacetonitrile (7.0 g) in acetonitrile (70 ml), diethoxymethylacetate (16.2 g) was added and the mixture heated at reflux for 30 minutes. The mixture was cooled to room temperature and filtered. The filtrate was poured into 600 ml diethyl ether, after which 800 ml ligroin P950 was added with rapid stirring. A light yellow oil formed in droplets, which spontaneously crystallized. The crystalline product was collected by filtration, washed with ligroin P950, and dried to yield 7.1 g of 2-(ethoxymethylidene)-2-(4'-methylsulfonamidobenzoyl)-acetonitrile.

Step 2—Preparation of Intermediate E

5-Carboxy-2-methylbenzoxazole (8.9 g) and methyl-p-toluenesulfonate (11.16 g) were combined and heated to 200° C. with stirring for 10 minutes. The mixture became a brown liquid and mild boiling occurred. The reaction was cooled to room temperature and the liquid solidified. Acetone (50 ml) was added, and with constant heating at reflux, the product was broken up with a spatula. The resulting slurry was heated at reflux for 15 minutes with rapid stirring and the off-white product was collected by filtration. This product was slurried again in refluxing acetone for 30 minutes, filtered, washed with ligroin P950, and dried to yield 9.3 g of 5-carboxy-2,3-dimethylbenzoxazolium p-toluene-sulfonate (Intermediate D).

Step 3—Preparation of Dye 4

To a slurry of Intermediate D (2.9 g) and Intermediate E (3.63 g) in ethanol (30 ml), 2.2 g triethylamine was added. The mixture was heated to reflux, held at reflux for 15 minutes, and then cooled to room temperature. The resulting solid was collected by filtration and washed with 25 ml ethanol. The solid was then slurried in 500 ml acetic acid at reflux for 30 minutes, chilled in ice to room temperature, and filtered. This solid was washed with 100 ml diethyl ether and dried to yield Dye 4. The dye had a melting point of greater than 310° C., a $\lambda$-max of 436 nm (methanol), and a $\epsilon$-max of $4.21 \times 10^4$. Elemental analysis indicated the following content: C=57.1%, H=4.0%, N=9.4%, S=7.1%.

EXAMPLE 3

Dye 9

Step 1—Intermediate F 2,4,5-Trimethyloxazole (11.66 g), $\alpha$-bromo-p-toluic acid (21.5 g), and dry acetonitrile (100 ml) were combined and refluxed for 14 hours under nitrogen with constant stirring. Upon cooling to room temperature, the reaction mixture solidified. The solid was diluted with 100 ml acetone and filtered. The collected solid was slurried in 400 ml refluxing acetone for 20 minutes and filtered while hot. The collected solid was again slurried in 400 ml refluxing acetone and filtered while hot. This solid was washed with 100 ml acetone, then 100 ml ligroin P950 and dried to yield 21.6 g 3-(4-carboxybenzyl)-2,4,5-trimethyloxazolium bromide (Intermediate F).

Step 2—Preparation of Dye 9

Intermediate F (3.26 g), Intermediate D from Example 2 (2.94 g), ethanol (30 ml), and triethylamine (2.2 g) were combined in that order. The mixture was brought to reflux with constant stirring and held at reflux for 45 minutes. After this time, the mixture had solidified to a bright yellow mass. This solid was removed from the heat, diluted with 60 ml ethanol, filtered, and the collected product was washed with 50 ml diethyl ether. The solid was then slurried in 300 ml acetic acid at reflux for 30 minutes, cooled to room temperature, and filtered. The resulting solid was washed with 300 ml diethyl ether, than 100 ml ligroin P950, and dried. This solid was dissolved in 30 ml dimethylsulfoxide at 60° C., cooled to 50° C., and combined with 60 ml methanol with stirring. After 1 minute, a solid had precipitated. The mixture was stirred at room temperature for 30 minutes and the solid was collected by filtration, washed with 50 ml methanol, and dried to yield 2.7 g of Dye 9. $\lambda$-max=433 nm (methanol), $\epsilon$-max=$5.68 \times 10^4$, elemental analysis: C=60.4%, H=4.7%, N=8.3%, S=6.3%.

EXAMPLES 4-13

Dye Wandering and Solubilization

Dyes 1-10 were prepared as solid particle dispersions by ball-milling according to the following procedure. Water (21.7 ml) and a 6.7% solution of Triton X-200 ® surfactant (2.65 g) were placed in a 60 ml screw-capped bottle. A 1.00 g sample of dye was added to this solution. Zirconium oxide beads (40 ml, 2 mm diameter)

were added and the container with the cap tightly secured was placed in a mill and the contents milled for four days. The container was removed and the contents added to a 12.5% aqueous gelatin (8.0 g) solution. The new mixture was placed on a roller mill for 10 minutes to reduce foaming and the resulting mixture was filtered to remove the zirconium oxide beads.

These solid particle dispersions of dyes 1–10 were coated on polyester supports according to the following procedure. A spreading agent (surfactant 10G ®) and a hardener (bis(vinylsulfonylmethyl) ether) were added to the dye-gelatin melt prepared as described above. A melt from this mixture was then coated on a poly(ethylene terephthalate) support to achieve a dye coverage of 0.32 g/m$^2$, a gelatin coverage of 1.60 g/m$^2$, a spreading agent level of 0.096 g/m$^2$, and a hardener level of 0.016 g/m$^2$. The absorbance of the dye dispersions was measured with a spectrophotometer. Identical elements were subjected to a 5 minute distilled water wash, to Kodak E-6 ® Processing (which is described in *British Journal of Photography Annual*, 1977, pp. 194–97), and to Kodak Prostar ® processing (which is used commercially to process microfilm, subjecting the elements to a development step at a pH of about 11.4 for about 30 seconds), and the absorbance was measured for each. The results are presented in TABLE 1.

Table I.

| Dye | λmax(nm) | Bandwidth (nm) | D-max | D-max After Water Wash | D-max After E-6 ® Processing | D-max After Prostar ® Processing |
|---|---|---|---|---|---|---|
| 1 | 438 | 88 | 2.28 | 2.22 | 0.02 | — |
| 2 | 425 | 99 | 1.72 | 1.72 | 0.01 | — |
| 3 | 481 | 88 | 1.53 | 1.57 | 0.02 | — |
| 4 | 434 | 110 | 1.13 | 0.82 | 0.01 | 0.01 |
| 5 | 463 | 72 | 1.73 | 1.69 | 0.01 | 0.01 |
| 7 | 440 | 110 | 1.22 | 1.05 | 0.01 | 0.01 |
| 8 | 483 | 105 | 1.22 | 0.98 | 0.01 | 0.01 |
| 9 | 401 | 71 | 0.86 | 0.76 | 0.01 | 0.01 |
| 10 | 411 | 75 | 0.87 | 0.87 | 0.01 | 0.03 |

The results presented in Table I show that the dyes 1–10 according to the invention are not affected by the water wash, indicating no wandering at coating pH, but are fully solubilized for removal and/or decolorization by the photographic processing to which they were subjected.

The invention has been described in detail with reference to preferred embodiments thereof. It should be understood, however, that variations and modifications can be made within the spirit and scope of the invention.

What is claimed is:

1. A photographic element comprising a support having thereon a radiation-sensitive silver halide emulsion layer and a hydrophilic colloid layer, which is the same as or different from the silver halide layer, comprising from 1 to 1000 mg/m$^2$ of a solid particle dispersion of a compound having the formula:

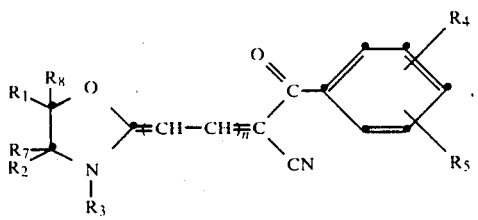

wherein $R_1$ and $R_2$ are each independently substituted or unsubstituted alkyl or substituted or unsubstituted aryl, or together repesent the atoms necessary to complete a substituted or unsubstituted 5- or 6- membered ring, and $R_1$ is H if $R_7$ is substituted or unsubstituted alkyl, $R_3$ is substituted or unsubstituted alkyl or aryl, $R_4$ and $R_5$ each independently represents H, substituted or unsubstituted alkyl, substituted or unsubstituted aryl, secondary or tertiary amino, $CO_2H$, or $NHSO_2R_6$, with the proviso that at least one of $R_4$, $R_5$, or a substituent on an aryl ring in $R_3$, on an aryl ring in $R_4$ or $R_5$, on an aryl ring in $R_1$ or $R_2$, or on an aryl ring formed by $R_1$ and $R_2$ is $CO_2H$ or $NHSO_2R_6$, $R_6$ is substituted or unsubstituted alkyl or substituted or unsubstituted aryl, and $R_7$ is substituted or unsubstituted alkyl, or together with $R_8$ forms a double bond, $R_8$ is H or together with $R_7$ forms a double bond, and n is 1 or 2, the particles in said dispersion having a mean diameter of from about 0.01 to 10 μm.

2. A photographic element according to claim 1 wherein $R_1$ and $R_2$ are each independently substituted or unsubstituted alkyl of from 1 to 6 carbon atoms, or together form a phenyl ring, $R_3$ is substituted or unsubstituted alkyl of from 1 to 8 carbon atoms or substituted or unsubstituted aryl of from 6 to 14 carbon atoms, $R_4$ is H, $CO_2H$, or $NHSO_2R_6$, $R_5$ is H, $CO_2H$, or $NHSO_2R_6$, $R_6$ is substituted or unsubstituted alkyl of from 1 to 6 carbon atoms or substituted or unsubstituted aryl of from 6 to 14 carbon atoms.

3. A photographic element according to claim 1 wherein $R_1$ and $R_2$ are each methyl or together with the carbon atoms to which they are attached, form a phenyl ring, $R_4$ is $CO_2H$, $R_5$ is H or $CO_2H$, and $R_3$ is methyl, ethyl, or benzyl.

4. A photographic element according to claim 1 wherein at least one of $R_4$, $R_5$, or a substituent on an aryl ring in $R_3$, on an aryl ring in $R_4$ or $R_5$, on an aryl ring in $R_1$ or $R_2$, or on an aryl ring formed by $R_1$ and $R_2$ is $CO_2H$, or at least two of $R_4$, $R_5$, or a substituent on an aryl ring in $R_3$, on an aryl ring in $R_4$ or $R_5$, on an aryl ring in in $R_1$ or $R_2$, or on an aryl ring formed by $R_1$ and $R_2$ are $NHSO_2R_6$.

5. A photographic element according to claim 1 wherein $R_7$ and $R_8$ together form a double bond.

6. A photographic element according to claim 1 wherein n is 1.

* * * * *